UNITED STATES PATENT OFFICE.

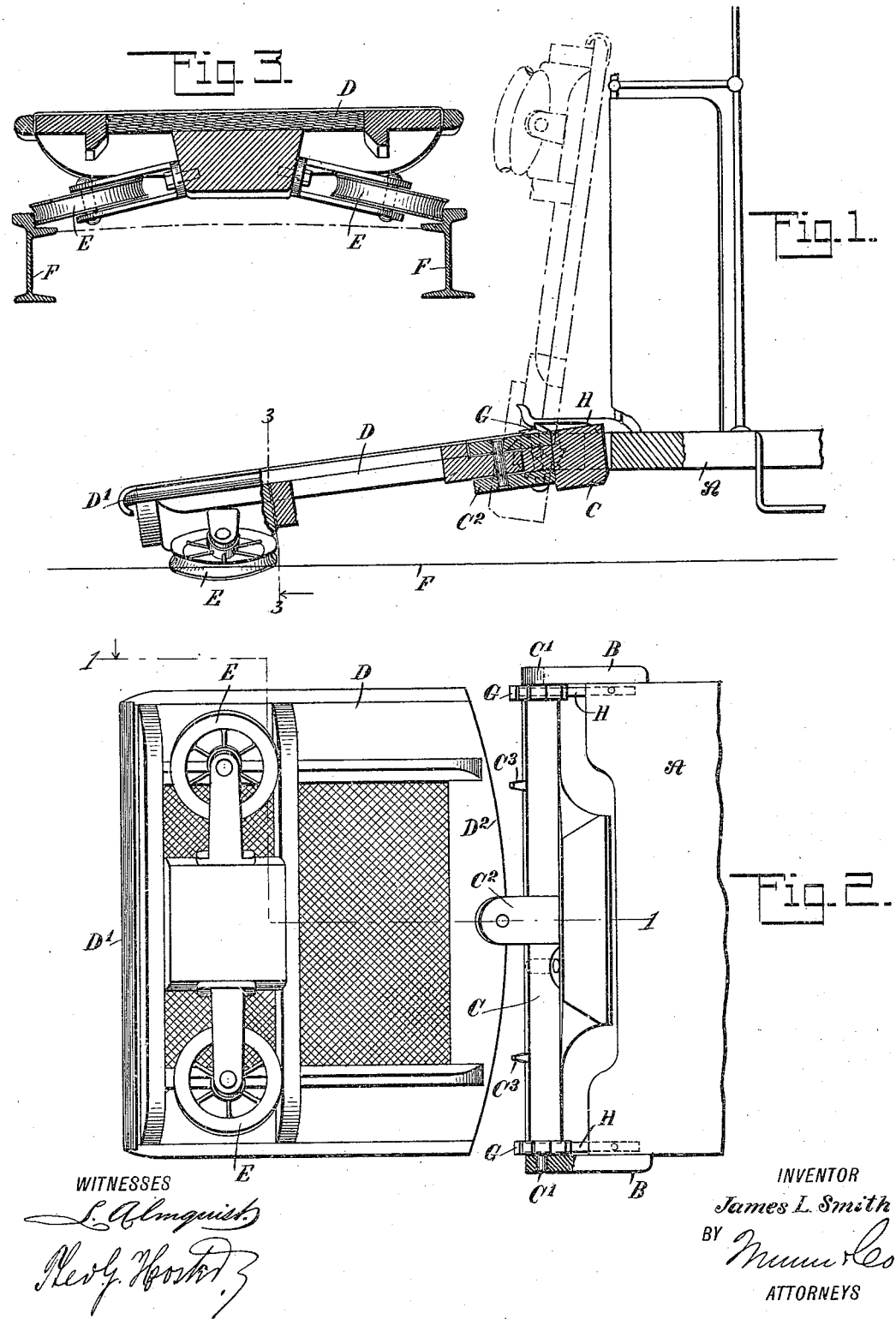

JAMES L. SMITH, OF TAUNTON, MASSACHUSETTS.

CAR-FENDER.

952,846.  Specification of Letters Patent.  Patented Mar. 22, 1910.

Application filed June 8, 1909. Serial No. 500,936.

*To all whom it may concern:*

Be it known that I, JAMES L. SMITH, a citizen of the United States, and a resident of Taunton, in the county of Bristol and State of Massachusetts, have invented a new and Improved Car-Fender, of which the following is a full, clear, and exact description.

The object of the invention is to provide a new and improved car fender, more especially designed for use on street cars, and arranged to run very close to the rails, with a view to readily pick up persons or other obstacles in the path of the car, thus preventing the persons from being run over and injured by the car.

The fender is pivoted at its rear end to a cross bar mounted on the car, and the front end of the fender is provided at its under side with inclined guiding and supporting wheels engaging the inner sides of the track rails.

A practical embodiment of the invention is represented in the accompanying drawings forming a part of this specification, in which similar characters of reference indicate corresponding parts in all the views.

Figure 1 is a side elevation of the improvement as applied, parts being in section, on the line 1—1 of Fig. 2; Fig. 2 is an inverted plan view of the same; and Fig. 3 is a transverse section of the same, on the line 3—3 of Fig. 1.

The platform A of the car is provided at its sides with bearings B, in which are journaled the trunnions C' of a cross bar C, provided at its middle with a forwardly-extending lug $C^2$, on which is pivoted the fender body D of any approved construction. On the under side of this fender body D, at or near the front end thereof, are journaled inclined guiding and supporting wheels E, adapted to travel on the inside of the track rails F on which travels the car provided with the fender. The wheels E are slightly inclined, as plainly indicated in Fig. 3, so as to clear the street surface, and at the same time allow the front end of the fender body D to run close to the track rails, so that any person or other obstruction in the path of the car is readily picked up by the fender body and is thus prevented from being run over and injured. The front end D' of the fender body D is preferably cushioned by being covered with leather, rubber or other suitable material. The rear end $D^2$ of the fender body D is hinged or pivoted, to allow the fender body to readily swing laterally, thus allowing ready taking of curves without danger of the wheels E jumping the track rails F. The swinging motion of the fender body D is limited by lugs $C^3$, formed on the front edge of the cross bar C.

In order to hold the fender body D at the desired angle and to allow swinging the same rearward and upward when not in use, the cross bar C can be turned and locked in a desired position by the use of ratchet wheels G, secured on the cross bar adjacent to the bearings B, the ratchet wheels being engaged by retaining pawls H attached to the platform A of the car. Thus by the arrangement described, the cross bar C can be turned in its bearings and locked against return movement by the pawls H engaging the ratchet wheels G.

Although I have shown a fender body D in the form of a flat platform covered with wire netting, I do not limit myself to this particular shape of fender body, as the same may be varied without deviating from the spirit of my invention.

The car fender shown and described, is very simple in construction, composed of comparatively few parts, and is not liable easily to get out of order.

Having thus described my invention, I claim as new and desire to secure by Letters Patent:

1. A car fender, comprising a fender body mounted to swing laterally and also mounted to be swung upward on the end of the car out of active position, guiding and supporting wheels journaled on the under side of the said fender body near the front end thereof to engage the sides of the track rails, and means for locking the fender body against return movement when swung out of active position.

2. A car fender, comprising a cross bar mounted to turn on the car body, means for locking the cross bar, a fender body mounted to swing laterally on the said cross bar, and guiding and supporting wheels journaled on the under side of the said fender body and adapted to run on the inner sides of the track rails.

3. A car fender, comprising a cross bar journaled at its ends on the car, ratchet wheels held on the said cross bar, retaining pawls on the car and engaging the said ratchet wheels, a fender body pivoted on the said bar at the middle thereof to swing laterally, and guiding and supporting wheels journaled on the under side of the said fender at the front end thereof to engage the sides of the track rails.

4. A car fender, comprising a cross bar journaled at its ends on the car, ratchet wheels held on the said cross bar, retaining pawls on the car and engaging the said ratchet wheels, a fender body pivoted on the said bar at the middle thereof to swing laterally, and guiding and supporting wheels journaled on the under side of the said fender at the front end thereof, to engage the sides of the track rails, the said guiding and supporting wheels being inclined.

5. A car fender, comprising a cross bar on the car provided at its middle with a forwardly extending lug, a fender body pivoted at its rear end on said lug to swing laterally, means on the cross bar for limiting the lateral swinging motion of the fender body, guiding and supporting wheels journaled on the underside of the fender body near the front end thereof to engage the track rails, the said cross bar being mounted to turn on the car to allow the fender body to be swung rearward and upward when not in use, and locking means for the cross bar to hold the fender body at the desired angle and to lock the cross bar against return movement when the fender body is not in use.

In testimony whereof I have signed my name to this specification in the presence of two subscribing witnesses.

JAMES L. SMITH.

Witnesses:
   THEO. G. HOSTER,
   JOHN P. DAVIS.